(12) United States Patent
Zhang et al.

(10) Patent No.: US 9,196,298 B1
(45) Date of Patent: Nov. 24, 2015

(54) ZERO PHASE START FOR ARRAY READER MAGNETIC RECORDING SYSTEM

(71) Applicant: LSI Corporation, San Jose, CA (US)

(72) Inventors: Haotian Zhang, Longmont, CO (US); Lu Pan, San Jose, CA (US); Haitao Xia, San Jose, CA (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 14/320,011

(22) Filed: Jun. 30, 2014

(51) Int. Cl.
  *G11B 5/09* (2006.01)
  *G11B 20/10* (2006.01)
  *G11B 5/48* (2006.01)

(52) U.S. Cl.
  CPC ........ *G11B 20/10481* (2013.01); *G11B 5/4813* (2013.01); *G11B 20/10037* (2013.01)

(58) Field of Classification Search
  CPC ............... G11B 5/012; G11B 20/1419; G11B 5/59655; G11B 20/10009; G11B 5/09; G11B 27/3027
  USPC ........... 360/75, 29, 39, 53, 48, 77.08, 42, 55, 360/46
  See application file for complete search history.

(56) References Cited

U.S. PATENT DOCUMENTS

| | | | |
|---|---|---|---|
| 6,710,951 B1 * | 3/2004 | Cloke | ............................ 360/29 |
| 8,929,011 B1 | 1/2015 | Song | |
| 9,047,148 B2 | 6/2015 | Li | |

OTHER PUBLICATIONS

U.S. Appl. No. 14/259,424, Unpublished (filed Apr. 23, 2014) (Liao).

\* cited by examiner

*Primary Examiner* — Nabil Hindi

(57) ABSTRACT

An apparatus includes an array reader with multiple of read heads operable to read a preamble pattern from a magnetic storage medium. A number of analog to digital converters are operable to sample an output of each of the read heads to generate digital data streams for the preamble pattern. A zero phase start calculation circuit is operable to calculate a phase offset between the digital data streams and to generate an integer phase adjustment signal and a fractional phase adjustment signal.

20 Claims, 5 Drawing Sheets

ZERO PHASE START FOR ARRAY READER MAGNETIC RECORDING SYSTEM

FIELD OF THE INVENTION

Various embodiments of the present invention provide systems and methods for calculating zero phase start in an array reader magnetic recording system.

BACKGROUND

In a typical magnetic storage system, digital data is stored in a series of concentric circles or spiral tracks along a storage medium. Data is written to the medium by positioning a read/write head assembly over the medium at a selected location as the storage medium is rotated, and subsequently passing a modulated electric current through the head assembly such that a corresponding magnetic flux pattern is induced in the storage medium. To retrieve the stored data, the head assembly is positioned again over the track as the storage medium is rotated. In this position, the previously stored magnetic flux pattern induces a current in the head assembly that can be converted to the previously recorded digital data. In an array reader magnetic recording system, the read/write head assembly includes an array of multiple read heads each positioned to read the target track. The separation of the read heads can vary, altering the phase offset between signals from the different read heads, particularly as the array of read heads is moved over the magnetic storage medium.

SUMMARY

Various embodiments of the present invention provide systems and methods for calculating zero phase start in an array reader magnetic recording system.

In some embodiments, an apparatus for calculating zero phase start includes an array reader with multiple of read heads operable to read a preamble pattern from a magnetic storage medium. A number of analog to digital converters are operable to sample an output of each of the read heads to generate digital data streams for the preamble pattern. A zero phase start calculation circuit is operable to calculate a phase offset between the digital data streams and to generate an integer phase adjustment signal and a fractional phase adjustment signal.

This summary provides only a general outline of some embodiments of the invention. The phrases "in one embodiment," "according to one embodiment," "in various embodiments", "in one or more embodiments", "in particular embodiments" and the like generally mean the particular feature, structure, or characteristic following the phrase is included in at least one embodiment of the present invention, and may be included in more than one embodiment of the present invention. Importantly, such phrases do not necessarily refer to the same embodiment. This summary provides only a general outline of some embodiments of the invention. Additional embodiments are disclosed in the following detailed description, the appended claims and the accompanying drawings.

BRIEF DESCRIPTION OF THE FIGURES

A further understanding of the various embodiments of the present invention may be realized by reference to the figures which are described in remaining portions of the specification. In the figures, like reference numerals may be used throughout several drawings to refer to similar components.

DETAILED DESCRIPTION OF THE INVENTION

A zero phase start calculation circuit and method are disclosed herein for an array reader magnetic recording system, also referred to as a two dimensional magnetic recording system. Different preamble patterns are recorded on alternating tracks of a storage medium, so that adjacent track interference, or contributions to signals from adjacent tracks when reading a target track, can be removed in zero phase start calculations. The zero phase start signal is calculated based on the signals from the array reader for the target track. In some embodiments, the zero phase start signal includes calculating differences between a target phase and an input phase for the signal from each read head in the array, weighting the phase differences and combining the weighted phase differences. The zero phase start calculation combines the signal based on preamble signal to noise ratio (SNR) estimation results to improve quality of the zero phase start signal.

Phase adjustments can then be made to the signals based on the zero phase start signal. The phase adjustments based on zero phase start include both integer phase offsets which are phase offsets that are integer multiples of a bit period, as well as fractional phase offsets which are phase offsets that are less than a single bit period. By compensating for both integer and fractional phase offsets between the signals in an array reader magnetic recording system, the phase aligned signals can be combined for reliable data detection.

Although the head separation estimation is disclosed herein with respect to example embodiments with two read heads in the array reader, the zero phase start calculation can be applied to array readers with any number of read heads, by repeating the process disclosed herein, including calculating phase differences for each read head between target and input phase, weighting and combining each of the phase differences to calculate the integer and fractional phase offsets to be applied to each signal to compensate for the phase offset between the streams due to read head separation.

Figure 1:
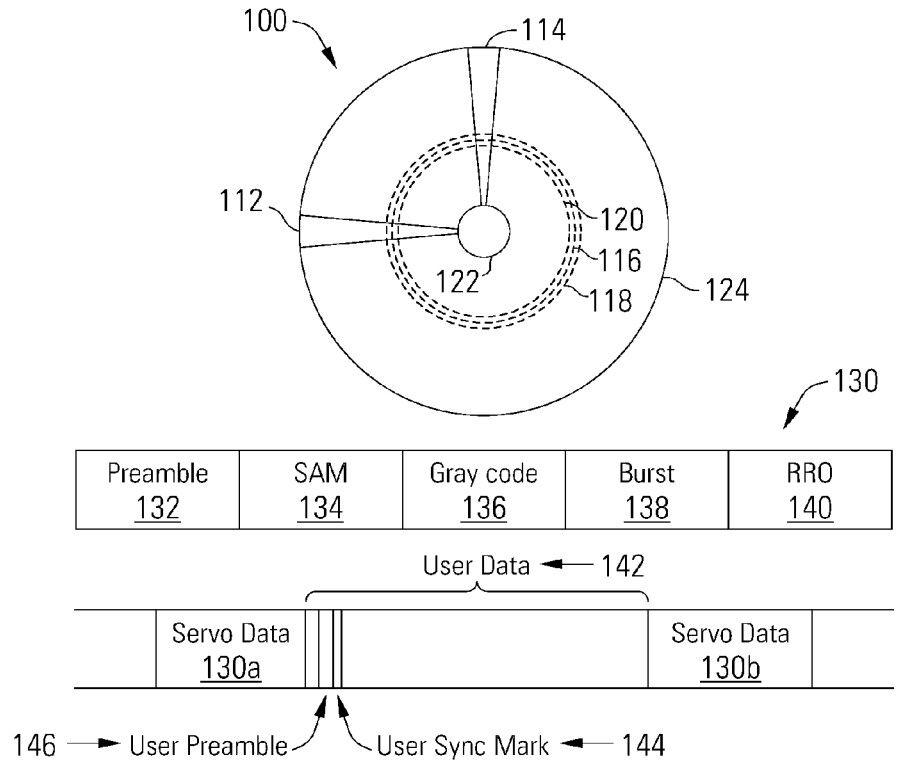
FIG. 1 is a diagram of a magnetic storage medium and sector data scheme that may be used with an array reader magnetic recording system with zero phase start calculation in accordance with some embodiments of the present invention.

Turning to FIG. 1, a diagram of a magnetic storage medium and sector data scheme is shown that can be used with an array reader magnetic recording servo channel with zero phase start calculation in accordance with some embodiments of the present invention. The magnetic storage medium 100 is shown with an example data track 116 and its two adjacent neighboring data tracks 118, 120 on disk platter 124, indicated as dashed lines. The tracks 116, 118, 120 are segregated by servo data written within servo wedges 112, 114. It should be noted that while three tracks 116, 118, 120 and two servo wedges 112, 114 are shown, hundreds of wedges and tens of thousands of tracks may be included on a given storage medium.

The servo wedges 112, 114 include servo data 130 that is used for control and synchronization of a read/write head assembly over a desired location on storage medium 100. In particular, the servo data 130 generally includes preamble patterns 132, with different patterns on alternating tracks, followed by a servo address mark (SAM) 134, a Gray code 136, a burst field 138, and a repeatable run-out (RRO) field 140. In some embodiments, a servo data set has two or more fields of burst information. It should be noted that different information can be included in the servo fields. Between the servo data bit patterns 130a and 130b, a user data region 142 is provided. User data region 142 can include one or more sets of data that are stored on storage medium 100. The data sets can include user synchronization information, some of which can be used as a mark to establish a point of reference from which processing of the data within user data region 142 may begin.

In operation, storage medium 100 is rotated in relation to a sensor with multiple read heads that senses information from the storage medium. In a read operation, the sensor would sense servo data from wedge 112 (i.e., during a servo data period) followed by user data from a user data region between wedge 112 and wedge 114 (i.e., during a user data period) and then servo data from wedge 114. In a write operation, the sensor would sense servo data from wedge 112 then write data to the user data region between wedge 112 and wedge 114, with location information in the user data region provided by a user sync mark 144 and a user preamble 146.

The data processing system that processes some or all of the servo data (e.g., 130) retrieved from servo regions (e.g., 112) is referred to herein as a servo channel. As the servo data (e.g., 130) is processed by the servo channel, signals from multiple read heads in the array reader magnetic recording system are produced representing the servo data (e.g., 130). The signals are phase aligned and combined based on the zero phase start calculation, yielding a combined servo signal with diversity. Servo address mark and Gray code detection can then be performed on the combined servo signal. In some embodiments, the servo address mark and Gray code detection can be performed on a selected servo signal, either the combined servo signal or any of the individual servo signals from the read heads in the sensor.

Figure 2:
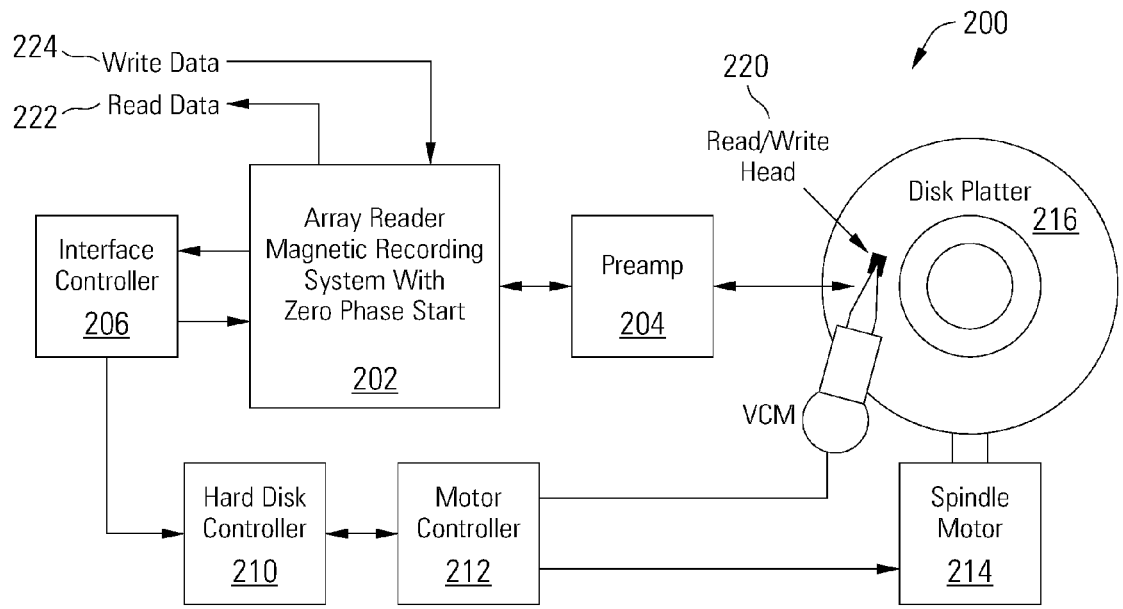
FIG. 2 depicts a storage system including an array reader magnetic recording system with zero phase start calculation in accordance with some embodiments of the present invention.

Turning to FIG. 2, a storage system 200 is disclosed which includes a read channel/servo channel circuit 202 with zero phase start calculation in accordance with some embodiments of the present invention. Storage system 200 may be, for example, a hard disk drive. Storage system 200 also includes a preamplifier 204, an interface controller 206, a hard disk controller 210, a motor controller 212, a spindle motor 214, a disk platter 216, and a read/write head assembly 220. Interface controller 206 controls addressing and timing of data to/from disk platter 216. The data on disk platter 216 consists of groups of magnetic signals that may be detected by read/write head assembly 220 when the assembly is properly positioned over disk platter 216. In one embodiment, disk platter 216 includes magnetic signals recorded in accordance with either a longitudinal or a perpendicular recording scheme.

In a typical read operation, read/write head assembly 220 is accurately positioned by motor controller 212 over a desired data track on disk platter 216. Motor controller 212 both positions read/write head assembly 220 in relation to disk platter 216 and drives spindle motor 214 by moving read/write head assembly 220 to the proper data track on disk platter 216 under the direction of hard disk controller 210. Spindle motor 214 spins disk platter 216 at a determined spin rate (RPMs). Once read/write head assembly 220 is positioned adjacent the proper data track, magnetic signals representing data on disk platter 216 are sensed by multiple read heads in the read/write head assembly 220 as disk platter 216 is rotated by spindle motor 214. The sensed magnetic signals are provided as continuous, minute analog signals representative of the magnetic data on a track on disk platter 216. These minute analog signals are transferred from read/write head assembly 220 to read channel circuit 202 via preamplifiers 204. Preamplifiers 204 are operable to amplify the minute analog signals accessed from disk platter 216. In turn, servo channel circuit 202 processes servo data to correctly position the read/write head assembly 220 over the disk platter 216, and the read channel circuit digitizes and decodes the received analog signal to recreate the information originally written to disk platter 216. This data is provided as read data 222 to a receiving circuit. A write operation is substantially the opposite of the preceding read operation with write data 224 being provided to read channel circuit 202. This data is then encoded and written to disk platter 216. While reading servo data, read channel/servo channel circuit 202 calculates the zero phase start based on the digitized signals from the read heads, compensating to phase offset due to downtrack head separation, aligning the phase of the signals from each read head in read/write head assembly 220 and combining the phase aligned signals. Data processing can then be performed on the combined signal, such as, but not limited to, servo data processing such as servo address mark detection and Gray code detection or user data processing such as detection and decoding.

It should be noted that in some embodiments storage system 200 is integrated into a larger storage system such as, for example, a RAID (redundant array of inexpensive disks or redundant array of independent disks) based storage system. Such a RAID storage system increases stability and reliability through redundancy, combining multiple disks as a logical unit. Data can be spread across a number of disks included in the RAID storage system according to a variety of algorithms and accessed by an operating system as if it were a single disk. For example, data can be mirrored to multiple disks in the RAID storage system, or can be sliced and distributed across multiple disks in a number of techniques. If a small number of disks in the RAID storage system fail or become unavailable, error correction techniques can be used to recreate the missing data based on the remaining portions of the data from the other disks in the RAID storage system. The disks in the RAID storage system can be, but are not limited to, individual storage systems such storage system 200, and can be located in close proximity to each other or distributed more widely for increased security. In a write operation, write data is provided to a controller, which stores the write data across the disks, for example by mirroring or by striping the write data. In a read operation, the controller retrieves the data from the disks. The controller then yields the resulting read data as if the RAID storage system were a single disk.

In addition, it should be noted that in some embodiments storage system 200 is modified to include solid state memory that is used to store data in addition to the storage offered by disk platter 216. This solid state memory may be used in parallel to disk platter 216 to provide additional storage. In such a case, the solid state memory receives and provides information directly to read channel circuit 202. Alternatively, the solid state memory may be used as a cache where it offers faster access time than that offered by disk platter 216. In such a case, the solid state memory may be disposed between interface controller 206 and read channel circuit 202 where it operates as a pass through to disk platter 216 when requested data is not available in the solid state memory or when the solid state memory does not have sufficient storage to hold a newly written data set. Based upon the disclosure provided herein, one of ordinary skill in the art will recognize a variety of storage systems including both disk platter 216 and a solid state memory.

Figure 3:
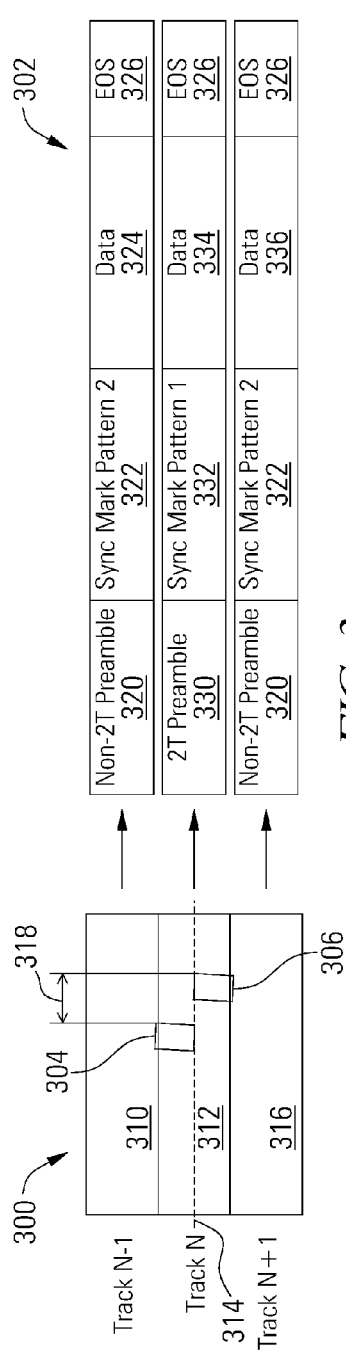
FIG. 3 depicts an array of read heads reading a target data track and a corresponding diagram showing servo data on the target data track and adjacent data tracks in accordance with some embodiments of the present invention.

Turning to FIG. 3, a diagram 300 depicts an array of read heads 304, 306 reading a target data track 312 with a corresponding diagram 302 showing preamble patterns 330, 320 and other data fields on the target data track 312 and adjacent data tracks 310, 316 in accordance with some embodiments of the present invention. Read heads 304, 306 on a read/write head are positioned over the target data track 312 so that both read heads 304, 306 produce signals corresponding substantially to the data on the target data track 312. The diversity in the signals, when they are combined, can help with data detection and other data processing on the combined signal. However, there is some down-track separation 318 between the read heads 304, 306, which can vary as the read/write head is swung in an arc between the inner and outer edges of the disk platter. The down-track separation 318 or head space results in a phase difference between the signals from the read heads 304, 306. This phase difference can be characterized by an integer phase offset M that is an integer multiple of a bit period T, and a fractional phase offset ΔT that is a fraction of the bit period T.

Some adjacent track interference can be expected in the signals from read heads 304 and 306 from adjacent tracts 310 and 316 when reading the target track 312, even when read heads 304 and 306 are positioned close to the center 314 of the target track 312. Different preambles are written to adjacent tracks so that signal contributions from adjacent tracks can be removed during the calculation of the zero phase start. In some embodiments, a 2 T preamble pattern such as, but not limited to, a repeating [1100] is written on every other track, for example on even tracks, and a 3 T preamble pattern such as, but not limited to, a repeating [111000] is written on the remaining tracks, for example on odd tracks. With orthogonal preambles written to adjacent tracks, the signal contributions from adjacent tracks is substantially removed during the zero phase start calculation. For example, when reading a 2 T preamble 330 from target track 312, the signals from read heads 304, 306 will also contain signal contributions from a 3 T preamble 320 in adjacent tracks 310, 316. However, if the zero phase start is calculated using integer operations to find the sin and cos terms for the 2 T preamble 330, the signal contributions from the 3 T preamble 320 are substantially excluded. The term "orthogonal" is thus used herein to refer to different preambles which are statistically independent such that integer calculations for sin and cos terms for one of the preambles will substantially exclude interference from the orthogonal preambles in adjacent tracks. In some embodiments, different sync mark patterns 322, 332 can also be used on alternating tracks preceding data fields 324, 334, 336 and end of sector fields 326. The zero phase start calculation allows the phase offset between the signals from different read heads in the array reader to be compensated for so that the signals can be combined before additional processing.

Figure 4:
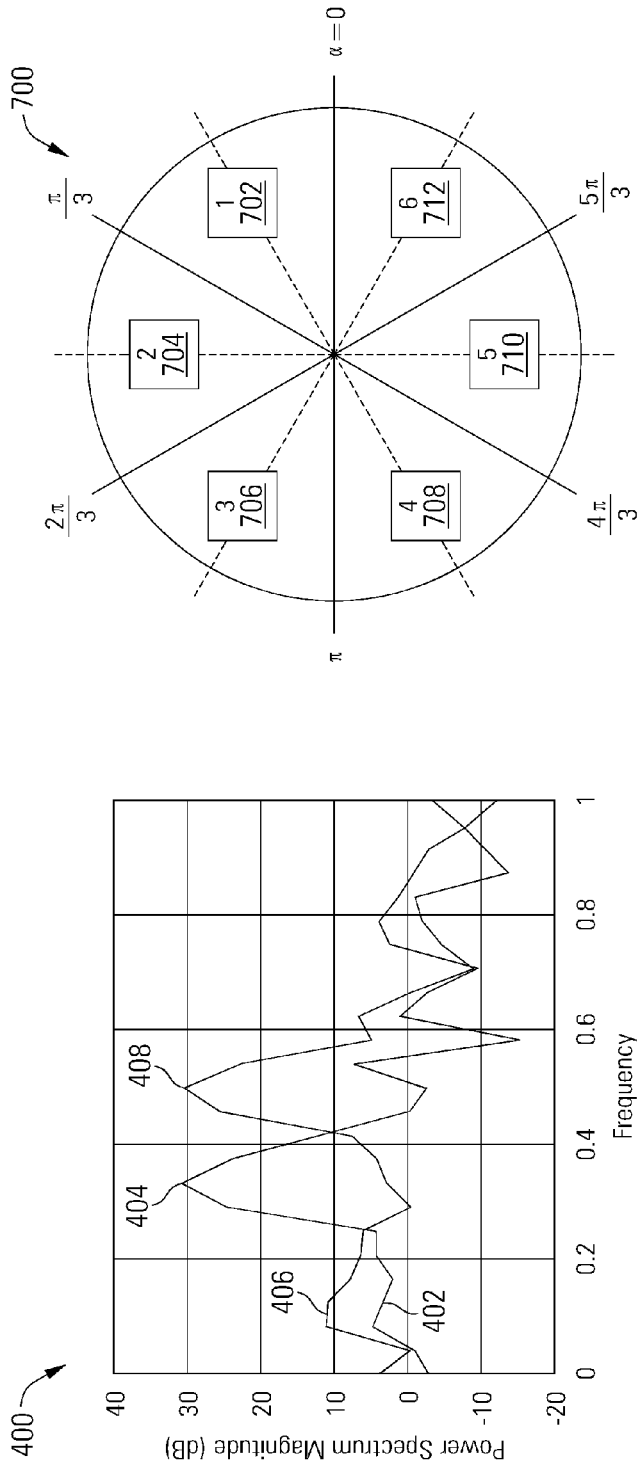
FIG. 4 depicts a plot of power spectrum magnitude versus frequency for two orthogonal preamble patterns in an array reader magnetic recording system with zero phase start calculation in accordance with some embodiments of the present invention.

Turning to FIG. 4, a plot 400 depicts power spectrum magnitude versus frequency for two orthogonal preamble patterns 402, 406 in an array reader magnetic recording system with zero phase start calculation in accordance with some embodiments of the present invention. Notably, the power spectrum magnitude peaks at different frequencies 404, 408 for the orthogonal preamble patterns 402, 406. Based on power spectral density analysis, the 2 T and 3 T preamble patterns can both be treated as approximate sinusoidal signals. The zero phase start calculation is adapted to operate on both of the orthogonal preamble patterns and to combine multiple data streams from the array reader based on preamble signal-to-noise ratio estimation, compensating for the phase offset between the data streams due to downtrack head separation.

The orthogonal preamble patterns are modeled differently in the digital samples for the signals from the read heads in the array reader. Let X[0] X[1] . . . X[31] be the sequence of preamble samples from an analog to digital converter (ADC). X[k] is earlier in time than X[k+1]. X[0] is the first analog to digital converter output sampled at a particular point after a read gate signal initiates the read. A 2 T preamble can be modeled as $$X(n) = \sin\left(\frac{\pi}{2}n + \varphi_{in}\right),$$

with a sampling interval T corresponding to a phase of $$\frac{\pi}{2},$$

where n is the sampling index. For the 2 T preamble, the period of the sinusoid is 4 samples. A 3 T preamble can be modeled as $$X(n) = \sin\left(\frac{\pi}{3}n + \varphi_{in}\right),$$

with a sampling interval T corresponding to a phase of $$\frac{\pi}{3}.$$

For the 3 T preamble, the period of the sinusoid is 6 samples.

Figure 5:
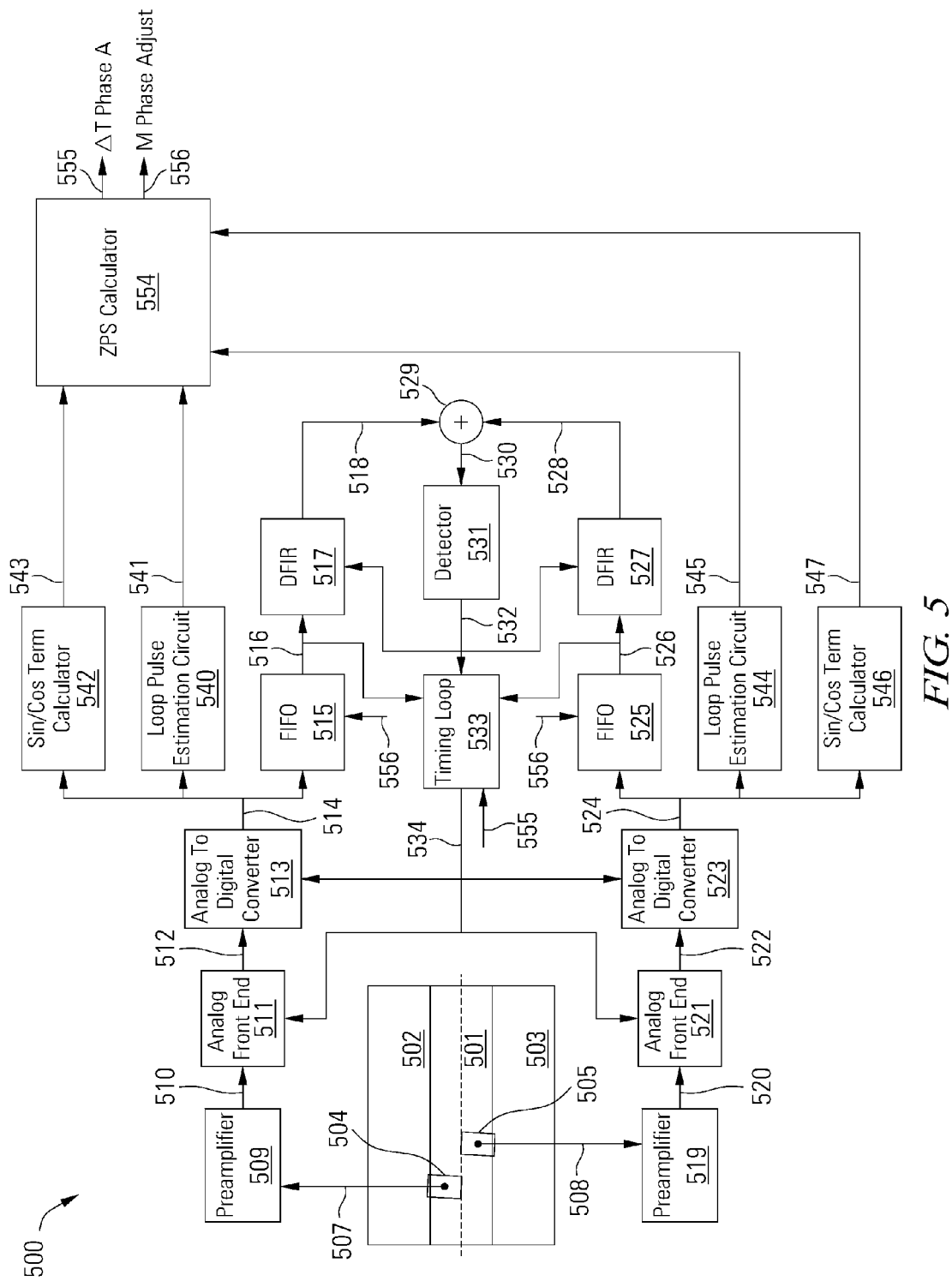
FIG. 5 is a block diagram of an array reader magnetic recording read channel/servo channel with zero phase start calculation in accordance with some embodiments of the present invention.

Although the zero phase start calculation is not limited to any particular application, an example read channel or servo channel 500 is depicted in FIG. 5 which benefits from the zero phase start calculation to phase align signals from an array reader. An array reader or sensor includes multiple read heads such as, but not limited to, the two read heads 504, 505 shown in FIG. 5. The read heads 504, 505 are positioned over a target track 501 between side tracks 502, 503. The downtrack separation between read heads 504, 505 causes a phase offset between the signals 507, 508 from the read heads 504, 505. The phase offset includes an integer phase offset M, an integer multiple of the bit period, and a fractional phase offset ΔT which is less than a single bit period. Separate read channel processing paths are provided for each of the signals 507, 508 from the read heads 504, 505.

Preamplifiers 509, 519 amplify the analog signals 507, 508 from read heads 504, 505, yielding amplified analog signals 510, 520. Analog signals 507, 508 may be, but are not limited to, minute analog electrical signals derived from read heads 504, 505 in a read/write head assembly that is disposed in relation to a storage medium (not shown). Based upon the disclosure provided herein, one of ordinary skill in the art will recognize a variety of sources from which analog signals 507, 508 may be derived. Analog front end circuits 511, 521 receive and process the amplified analog signals 510, 520, providing processed analog signals 512, 522 to analog to digital converter circuits 513, 523. Analog front end circuits 511, 521 may include, but are not limited to, an analog filter and an amplifier circuit as are known in the art. Based upon the disclosure provided herein, one of ordinary skill in the art will recognize a variety of circuitry that may be included as part of analog front end circuits 511, 521.

Analog to digital converter circuits 513, 523 convert processed analog signals 512, 522 into corresponding series of digital samples 514, 524. Analog to digital converter circuits 513, 523 may be any circuits known in the art that are capable of producing digital samples corresponding to analog input signals. Based upon the disclosure provided herein, one of ordinary skill in the art will recognize a variety of analog to digital converter circuits that may be used in relation to different embodiments of the present invention.

The analog front end 511, 521 and analog to digital converter circuits 513, 523 can be controlled by a feedback signal 534 from a timing loop 533, for example to adjust the filtering and sampling phase to reduce or eliminate the fractional phase offset ΔT between the signal paths. The timing loop 533 can include any suitable circuits for adjusting the feedback signal 534 to reduce or eliminate the fractional phase offset ΔT, such as, but not limited to, a frequency synthesizer and comparator to adjust the sampling clock to reduce an error signal. Notably, the timing loop 533 can scale the digital samples 516, 526 before using them to adjust the feedback signal 534, so that changes in the adjusting the feedback signal 534 can reduce phase errors in both digital samples 516, 526 equally, or can focus on adjusting the feedback signal 534 to reduce phase errors in either digital samples 516 or 526. The digital samples 516, 526 can be scaled in any suitable manner, such as using multipliers in timing loop 533. For example, by applying a timing loop error combining ratio of [1 0], the timing loop 533 generates feedback signal 534 based on the digital samples 516 and not on digital samples 526. By applying a timing loop error combining ratio of [½ ½], the timing loop 533 generates feedback signal 534 based on the digital samples 516 and 526 equally.

The series of digital samples 514, 524 are provided to delay circuits such as, but not limited to, first-in first-out (FIFO) memories 515, 525, which remove the integer phase offset M based on a phase offset M adjustment signal 556. For example, the earlier of the series of digital samples 514, 524 is delayed in its associated FIFO memory 515, 525 by M bit periods, so that any phase offset between the digital samples 516, 526 at the outputs of the FIFO memories 515, 525 is less than one bit period. Any remaining phase offset or fractional phase offset ΔT can be corrected by the timing loop 533 based on the fractional phase offset ΔT adjustment signal 555.

The digital samples 516, 526 are provided to equalizer circuits 517, 527. Equalizer circuits 517, 527 apply an equalization algorithm to digital samples 516, 526 to yield equalized outputs 518, 528. In some embodiments, equalizer circuits 517, 527 apply a joint equalization algorithm to digital samples 516, 526. In some embodiments of the present invention, equalizer circuits 517, 527 are digital finite impulse response filter circuits as are known in the art. Based upon the disclosure provided herein, one of ordinary skill in the art will recognize a variety of equalizer circuits that may be used in relation to different embodiments of the present invention.

The digital samples 516, 526 and/or equalized outputs 518, 528 can receive any other desired processing, such as, but not limited to, noise scaling, prior to being combined in adder circuit 529 to generate combined signal 530.

The combined signal 530 is provided to a data detector circuit 531 which applies a data detection algorithm to combined signal 530 to yield detected output 532. In some embodiments, the data detection algorithm may be but is not limited to, a Soft Output Viterbi Algorithm (SOVA), or a Maximum a Posteriori detection algorithm as are known in the art. Based upon the disclosure provided herein, one of ordinary skill in the art will recognize a variety of data detection algorithms that may be used in relation to different embodiments of the present invention.

The detected output 532 can be used or further processed in any desired manner, for example by decoding, de-interleaving and producing hard decisions representing the originally stored data. The detected output 532 can also be used, for example, to adapt filter tap coefficients for equalizer circuits 517, 527 and to generate an error signal for the timing loop 533.

The digital samples 514, 524 are also provided to loop pulse estimation circuits 540, 544 which calculate loop pulse estimations 541, 545. The loop pulse estimation circuits 540, 544 can calculate the loop pulse estimations 541, 545 in any suitable manner, for example by applying a least mean squares algorithm to the digital samples 514, 524 and detected output 532 to obtain the loop pulse estimations. The loop pulse estimations 541, 545 are partial response targets representing the bit response of the data paths. Based upon the disclosure provided herein, one of ordinary skill in the art will recognize a variety of loop pulse estimation circuits that may be used in relation to different embodiments of the present invention.

The digital samples 514, 524 are also provided to sin/cos term calculator circuits 542, 546 which calculate sin and cos terms 543, 547 for the preamble patterns in digital samples 514, 524 according to the following equations:

$$sinterm_{2T} = \sum_{n=0}^{11} X(n) * \sin\left(2\pi\frac{n}{4}\right) \quad \text{(Eq 1)}$$

$$costerm_{2T} = \sum_{n=0}^{11} X(n) * \cos\left(2\pi\frac{n}{4}\right) \quad \text{(Eq 2)}$$

$$sinterm_{3T} = \sum_{n=0}^{11} X(n) * \sin\left(2\pi \frac{n}{6}\right) \quad \text{(Eq 3)}$$

$$costerm_{3T} = \sum_{n=0}^{11} X(n) * \cos\left(2\pi \frac{n}{6}\right) \quad \text{(Eq 4)}$$

The sin/cos term calculator circuits 542, 546 apply either equations 1 and 2 to calculate the sin and cos terms 543, 547 for the 2 T preamble pattern, or equations 3 and 4 to calculate the sin and cos terms 543, 547 for the 3 T preamble pattern, depending on whether the target track 501 contains the 2 T or the 3 T preamble pattern. In some embodiments, for example, this determination is made based on whether the current target track 501 is an odd track or an even track and upon a predetermined knowledge of what preamble is stored on particular tracks. The equations 1-4 are based upon a 12 T window, the least common multiple of the full period of both preamble patterns. The window length associated with the zero phase start calculation can be any integer multiple of the least common multiple of the full period of all preamble patterns, such as 24 T, 36 T, 48 T etc. given the 2 T, 3 T preamble patterns disclosed herein, with the resulting sin/cos terms from each 12 T slot averaged. Equations 1-4 are effectively convolution operations that yield the Discrete Fourier Transform coefficients at the 2 T frequency or the 3 T frequency.

In some embodiments, equations 1-4 are implemented in the sin/cos term calculator circuits 542, 546 using discrete calculations on the contents of accumulators. For example, with a 4 T implementation, the sin and cos terms for the 2 T preamble are accumulated for every 4 T clock within zero phase start collection windows as follows:

$$m\,\text{Sin Term}_{2T}\!+\!=X[-3]-X[-1] \quad \text{(Eq 5)}$$

$$m\,\text{Cos Term}_{2T}\!+\!=X[-2]-X[0] \quad \text{(Eq 6)}$$

where for every 4 T cycle, $\{X[-3], X[-2], X[-1], X[0]\}$ are the input analog to digital samples with $X[0]$ representing the current sample. In the 4 T implementation, the sin and cos terms for the 3 T preamble are accumulated for every 4 T clock within zero phase start collection windows, accumulating the product of the input sample and a coefficient from a 12-coefficient sequence as follows:

$$mSinTerm_{3T} \mathrel{+}= \sum_{i=-3}^{0} m12TSinCoef[(mWindowIndex+i)\%12] * X[i] \quad \text{(Eq 7)}$$

$$mCosTerm_{3T} \mathrel{+}= \quad \text{(Eq 8)}$$

$$\sum_{i=-3}^{0} m12TCosCoef[(mWindowIndex+i)\%12] * X[i]$$

where $$m12TSinCoef[12] = \quad \text{(Eq 9)}$$

$$\left[1, \frac{1}{2}, -\frac{1}{2}, -1, -\frac{1}{2}, \frac{1}{2}, 1, \frac{1}{2}, -\frac{1}{2}, -1, -\frac{1}{2}, \frac{1}{2}\right]$$

$$m12TCosCoef[12] = \quad \text{(Eq 10)}$$

$$\left[0, \frac{\sqrt{3}}{2}, \frac{\sqrt{3}}{2}, 0, -\frac{\sqrt{3}}{2}, -\frac{\sqrt{3}}{2}, 0, \frac{\sqrt{3}}{2}, \frac{\sqrt{3}}{2}, 0, -\frac{\sqrt{3}}{2}, -\frac{\sqrt{3}}{2}\right]$$

The sin and cos terms 543, 547 and the loop pulse estimations 541, 545 are provided to a zero phase calculation circuit 554, which calculates the integer phase offset M adjustment signal 556 and the fractional phase offset $\Delta T$ adjustment signal 555. The phase differences in the signals from the read heads 504, 505 can then be corrected by the FIFOs 515, 525 and the timing loop 533 based on the integer phase offset M adjustment signal 556 and the fractional phase offset $\Delta T$ adjustment signal 555.

Figure 6:
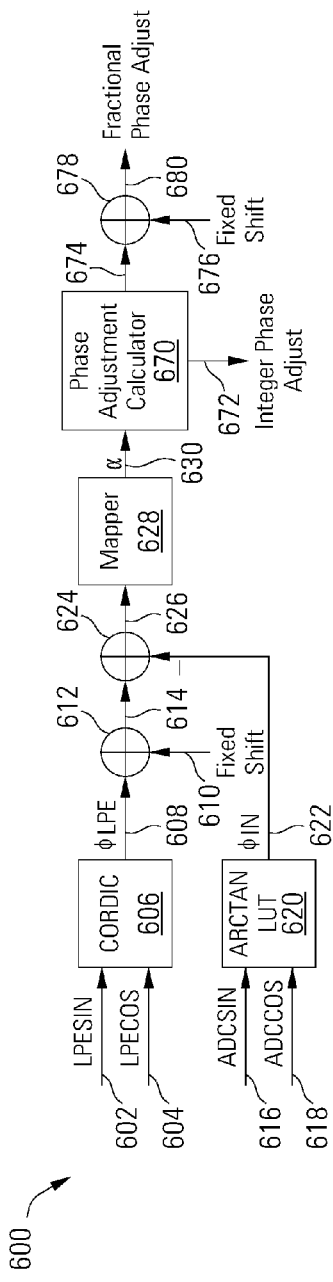
FIG. 6 is a block diagram of a single-input zero phase start calculation circuit.

To simplify the disclosure of the multiple input zero phase calculation circuit for the array reader, the zero phase calculation circuit 600 will first be described with respect to the input from a single read head in the array reader. Turning to FIG. 6, the sin term of the loop pulse estimation (LPE SIN) 602 and the cos term of the loop pulse estimation (LPE COS) 604, calculated by loop pulse estimation circuit 540 or 544, are provided to a CORDIC circuit 606, a coordinate rotation digital computer which calculates the target sampling phase $\phi_{LPE}$ 608, which is in the range $$\left[0, \frac{\pi}{2}\right)$$

for a 2 T preamble and $$\left[0, \frac{\pi}{3}\right)$$

for a 3 T preamble. For a 2 T preamble, the target sampling phase $\phi_{LPE}$ 608 can have four values, $$\varphi_{LPE},\ \varphi_{LPE} - \frac{\pi}{2},\ \varphi_{LPE} - \pi,\ \text{and}\ \varphi_{LPE} - \frac{3\pi}{2},$$

depending on which is the closest to the input sampling phase $\phi_{in}$ 622. For a 3 T preamble, the target sampling phase $\phi_{LPE}$ 608 can have six values, $$\varphi_{LPE},\ \varphi_{LPE} - \frac{\pi}{3},\ \varphi_{LPE} - \frac{2\pi}{3},\ \varphi_{LPE} - \pi,\ \varphi_{LPE} - \frac{4\pi}{3},\ \text{and}\ \varphi_{LPE} - \frac{5\pi}{2},$$

depending on which is the closest to the input sampling phase $\phi_{in}$ 622.

A fixed phase shift 610 is added to the target sampling phase $\phi_{LPE}$ 608 in adder 612, adjusting the range of shifted target sampling phase 614. For a 2 T preamble, the fixed phase shift 610 is $$\frac{\pi}{4},$$

for a 3 T preamble, the fixed phase shift 610 is $$\frac{\pi}{6}.$$

In the worst case for the 2 T preamble, the sampling phase would need to shift $$-\frac{\pi}{4}, \text{ i.e., } -0.5T,$$

to the target sampling phase $\phi_{LPE}$ 608. In the worst case for the 3 T preamble, the sampling phase would need to shift $$-\frac{\pi}{6}, \text{ i.e., } -0.5T,$$

to the target sampling phase $\phi_{LPE}$ 608. The phase adjustment is defined as $\phi_{adj}$, and the task of the zero phase calculation circuit 600 is to estimate the input sampling phase $\phi_{in}$ 622 and then to compute the phase adjustment $\phi_{adj}$. Again, for a 2 T preamble, $$\varphi_{adj} \in \left[-\frac{\pi}{2}, \frac{\pi}{2}\right)$$

that $\phi_{in}+\phi_{adj}$ is equal one of $$\varphi_{LPE}, \varphi_{LPE} - \frac{\pi}{2}, \varphi_{LPE} - \pi, \text{ and } \varphi_{LPE} - \frac{3\pi}{2}.$$

For a 3 T preamble, $$\varphi_{adj} \in \left[-\frac{\pi}{3}, \frac{\pi}{3}\right)$$

so that $\phi_{in}+\phi_{adj}$ is equal to one of $$\varphi_{LPE}, \varphi_{LPE} - \frac{\pi}{3}, \varphi_{LPE} - \frac{2\pi}{3}, \varphi_{LPE} - \pi, \varphi_{LPE} - \frac{4\pi}{3}, \text{ and } \varphi_{LPE} - \frac{5\pi}{3}.$$

The input sampling phase $\phi_{in}$ 622 is calculated in some embodiments using an arctan lookup table 620 based on the sin and cos terms ADC SIN 616, ADC COS 618 calculated in the sin/cos term calculator circuits 542, 546. The input sampling phase $\phi_{in}$ 622 is subtracted from the shifted target sampling phase 614 in subtraction circuit 624, yielding a phase difference 626. A mapper circuit 628 maps the phase difference 626 to a range of [0,2π) by adding or subtracting 2π, yielding a phase difference α 630 in the range of [0,2π). A phase adjustment calculator 670 calculates an integer phase adjustment 672 and a fractional phase adjustment 674 based on the phase difference α 630. A fixed shift 676 is added to the fractional phase adjustment 674 in adder 678, reversing the shift added in adder 612, yielding fractional phase adjustment 680. The fractional phase adjustment 680 can thus be represented as a minus the result of integer phase adjustment 672 times the phase of a bit period T $$\left(\frac{\pi}{2} \text{ for } 2T \text{ preamble}, \frac{\pi}{3} \text{ for } 3T \text{ preamble}\right),$$

minus fixed shift 676. For a 2 T preamble, the fixed phase shift 676 is $$\frac{\pi}{4},$$

for a 3 T preamble, the fixed phase shift 676 is $$\frac{\pi}{6}.$$

Figure 7:
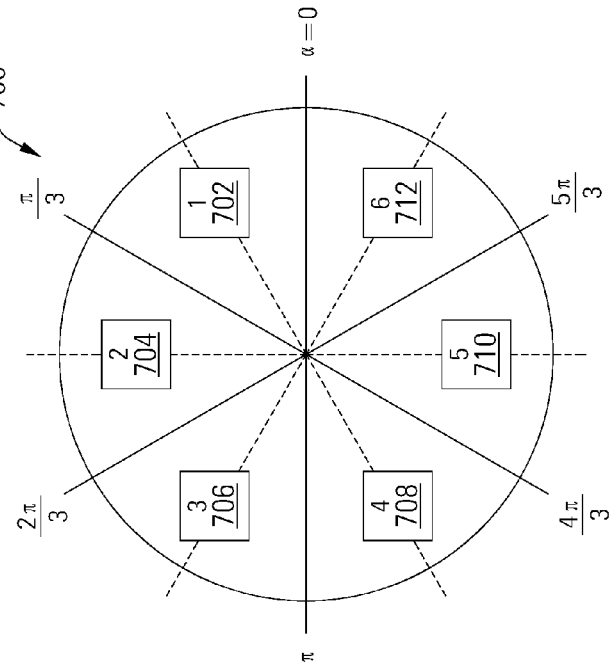
FIG. 7 is a polar diagram illustrating the division of a full $2\pi$ cycle of a 3 T preamble pattern into six phase segments in accordance with some embodiments of the present invention.

The integer phase adjustment 672 is the phase adjustment needed to reduce the phase difference between the target sampling phase $\phi_{LPE}$ 608 and the input sampling phase $\phi_{in}$ 622 to less than a single bit period. Given a 2 T period, the period of the preamble [1100] can be divided into four quadrants. Given a 3 T period, the period of the preamble [111000] can be divided into six sextants. The division of the 3 T preamble period into six sextants 702, 704, 706, 708, 710, 712 is shown in the plot 700 of FIG. 7. The corresponding index of the starting sample and the phase adjustment for each sextant is set forth in Table 1:

TABLE 1

| α sextant | X(0) index | Phase Adjustment |
|---|---|---|
| 1 | 0 | $\alpha - \frac{\pi}{6}$ |
| 2 | 5 | $\alpha - \frac{\pi}{3} - \frac{\pi}{6}$ |
| 3 | 4 | $\alpha - \frac{2\pi}{3} - \frac{\pi}{6}$ |
| 4 | 3 | $\alpha - \pi - \frac{\pi}{6}$ |
| 5 | 2 | $\alpha - \frac{4\pi}{3} - \frac{\pi}{6}$ |
| 6 | 1 | $\alpha - \frac{5\pi}{3} - \frac{\pi}{6}$ |

The values of various phase ranges and phase offsets for an example embodiment with a 2 T preamble and a 3 T preamble are set forth in Table 2:

TABLE 2

|  | 3T Preamble | 2T Preamble |
|---|---|---|
| $\phi_{LPE}$ range | $\left[0, \frac{\pi}{3}\right)$ | $\left[0, \frac{\pi}{2}\right)$ |
| $\phi_{in}$ range | [0,2π) | [0,2π) |

TABLE 2-continued

|  | 3T Preamble | 2T Preamble |
|---|---|---|
| $\phi_{LPE}$ offset | $\dfrac{\pi}{6}$ | $\dfrac{\pi}{4}$ |
| α range | [0,2π) | [0,2π) |
| Integer phase offset | 0,1,2,3,4,5 | 0,1,2,3 |
| Fractional phase offset | $\left[-\dfrac{\pi}{6}, \dfrac{\pi}{6}\right)$ | $\left[-\dfrac{\pi}{4}, \dfrac{\pi}{4}\right)$ |

Figure 8:
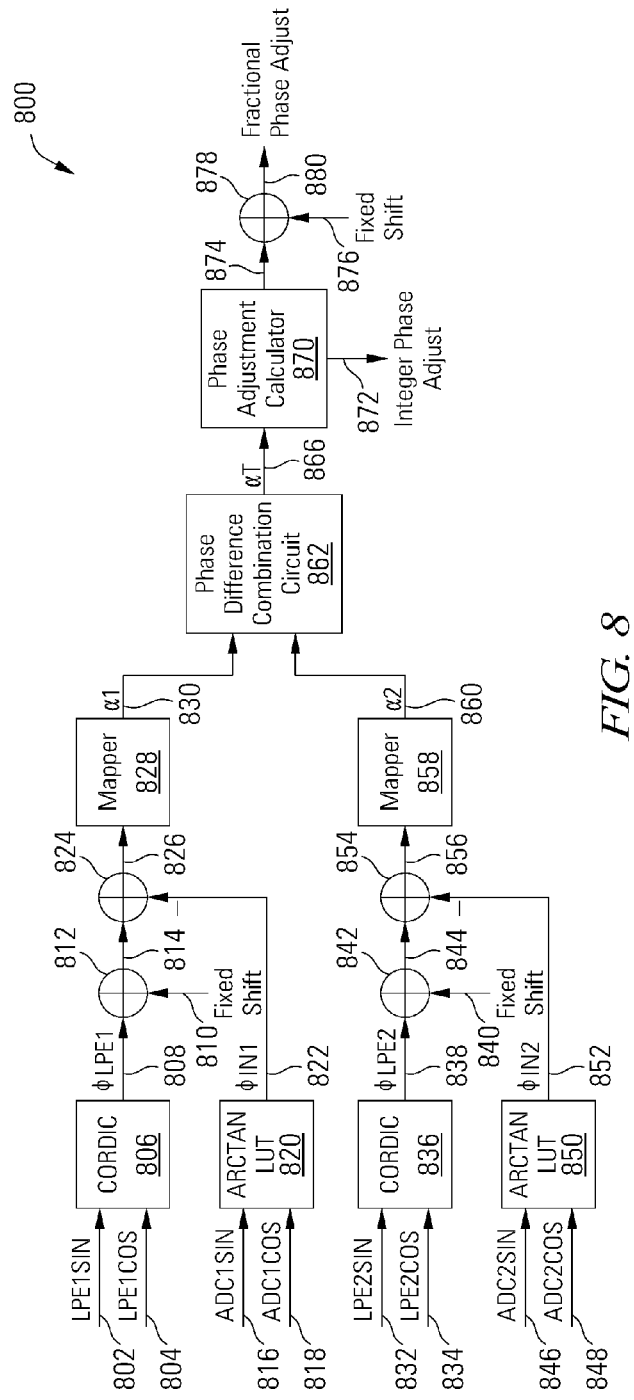
FIG. 8 is a block diagram of a two-input zero phase start calculation circuit in an array reader magnetic recording system in accordance with some embodiments of the present invention.

Turning to FIG. 8, a two-input zero phase start calculation circuit 800 in an array reader magnetic recording system is depicted in accordance with some embodiments of the present invention. The sin term of the loop pulse estimation (LPE1 SIN) 802 and the cos term of the loop pulse estimation (LPE1 COS) 804 calculated by the loop pulse estimation circuit 540 for the signal from the first read head 504 are provided to a CORDIC circuit 806, which calculates the target sampling phase $\phi_{LPE1}$ 808. A fixed phase shift 810 is added to the target sampling phase $\phi_{LPE1}$ 808 in adder 812, adjusting the range of shifted target sampling phase 814. The sin and cos terms ADC1 SIN 816, ADC1 COS 818 calculated by the sin/cos term calculator circuit 542 for the signal from the first read head 504 are provided to an arctan lookup table 820, yielding the input sampling phase $\phi_{in1}$ 822. The input sampling phase $\phi_{in1}$ 822 is subtracted from the shifted target sampling phase 814 in subtraction circuit 824, yielding phase difference 826. A mapper circuit 828 maps the phase difference 826 to a range of [0,2π) by adding or subtracting 2π, yielding a phase difference α1 830 in the range of [0,2π).

A phase difference α2 860 is also calculated based on the signal from the second read head 505. The sin term of the loop pulse estimation (LPE2 SIN) 832 and the cos term of the loop pulse estimation (LPE2 COS) 834 calculated by the loop pulse estimation circuit 544 for the signal from the second read head 505 are provided to a CORDIC circuit 836, which calculates the target sampling phase $\phi_{LPE2}$ 838. A fixed phase shift 840 is added to the target sampling phase $\phi_{LPE2}$ 838 in adder 842, adjusting the range of shifted target sampling phase 844. The sin and cos terms ADC2 SIN 846, ADC2 COS 848 calculated by the sin/cos term calculator circuit 546 for the signal from the second read head 503 are provided to an arctan lookup table 850, yielding the input sampling phase $\phi_{in2}$ 852. The input sampling phase $\phi_{in2}$ 852 is subtracted from the shifted target sampling phase 844 in subtraction circuit 854, yielding phase difference 856. A mapper circuit 858 maps the phase difference 856 to a range of [0,2π) by adding or subtracting 2π, yielding a phase difference α2 860 in the range of [0,2π).

The phase differences α1 830 and α2 860 are combined in phase difference combination circuit 862, yielding total phase difference αT 866. A phase adjustment calculator 870 calculates an integer phase adjustment 872 and a fractional phase adjustment 874 based on the phase difference α 830. A fixed shift 876 is added to the fractional phase adjustment 874 in adder 878, reversing the shifts added in adders 812, 842, yielding fractional phase adjustment 880. The parameters and ranges applied in zero phase start calculation circuit 800 are adjusted according to the preamble pattern recorded in the target track, as disclosed above with respect to FIG. 6 and in Table 2.

The phase difference combination circuit 862 combines phase differences α1 830 and α2 860 using a weighted combination. The weights are calculated based on several factors, the window length for the zero phase start calculation, and an estimation of the preamble signal-to-noise ratio. In the example phase difference combination, it is assumed that stream 1 is the early stream. The phase difference α can be represented as:

$$\alpha_1 = \phi_{LPE1} + \theta - \phi_{in1} \tag{Eq 11}$$

$$\alpha_2 = \phi_{LPE2} + \theta - \phi_{in2} \tag{Eq 12}$$

where $$\theta = \frac{\pi}{4}$$

for a 2 T preamble and $$\theta = \frac{\pi}{6}$$

for a 3 T preamble.

In an ideal case, the input sampling phases are related as follows:

$$\phi_{in2} = \phi_{in1} + kT + \Delta T \tag{Eq 13}$$

where k=M%4, (the integer phase offset between the read heads 503, 504 modulo 4) for a 2 T preamble and k=M%6 for a 3 T preamble.

In the loop pulse estimation, ΔT is used to constrain the phase difference between the loop pulse estimation adaptations of the two streams. Thus, in an ideal case, $\phi_{LPE2} = \phi_{LPE1} + \Delta T$. The ΔT in the target sampling phase $\phi_{LPE}$ and in the input sampling phase $\phi_{in}$ cancel or compensate for each other, so that the impact of ΔT can be ignored on the phase difference α in the zero phase start calculation process.

The combined zero phase start values giving the integer phase adjustment and the fractional phase adjustment are based on $\alpha_{final}$, calculated as a weighted combination of $\alpha_1$ and $\alpha_2 + kT$:

$$\alpha_{final} = w1 * \alpha_1 + w2 * (\alpha_2 + kT) \tag{Eq 14}$$

where the weights w1 and w2 are calculated based on the zero phase start window lengths and the preamble signal-to-noise ratio estimations of the two streams as follows:

$$w1 = (windowlength1 + 1) * \frac{PSNR1}{sum} \tag{Eq 15}$$

$$w2 = (windowlength2 + 1) * \frac{PSNR2}{sum} \tag{Eq 16}$$

$$sum = (windowlength1+1)*PSNR1 + (windowlength2+1)*PSNR2 \tag{Eq 17}$$

Figure 9:
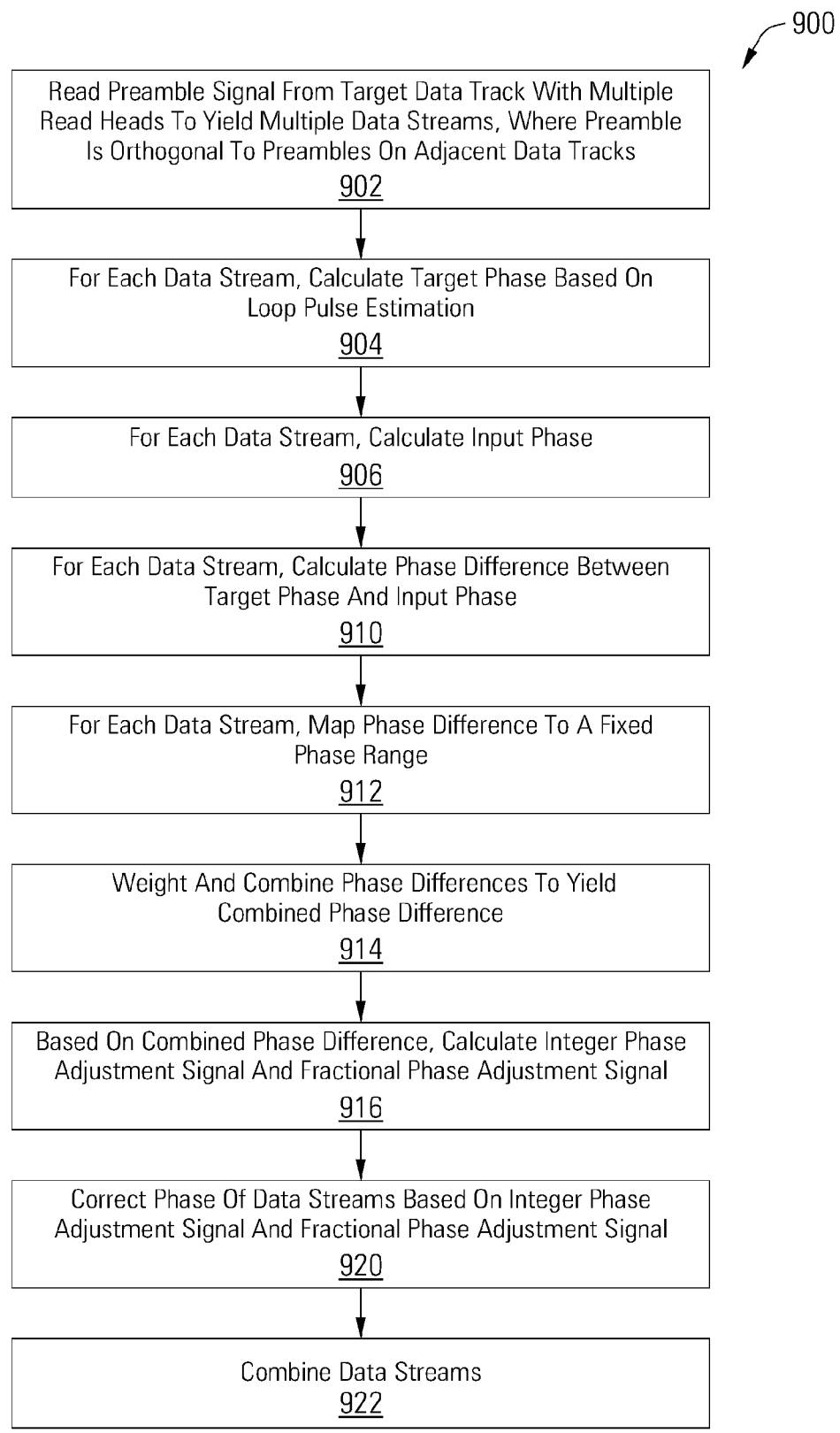
FIG. 9 is a flow diagram showing a method for calculating zero phase start in an array reader magnetic recording system in accordance with some embodiments of the present invention.

Turning to FIG. 9, a flow diagram 900 shows a method for calculating zero phase start in an array reader magnetic recording system in accordance with some embodiments of the present invention. Following flow diagram 900, a preamble signal is read from a target data track with multiple read heads to yield multiple data streams, where the preamble is orthogonal to preambles on adjacent data tracks. (Block 902) For each data stream, the target phase is calculated based on the loop pulse estimation. (Block 904) For each data stream, the input phase is calculated. (Block 906) For each data stream, the phase difference is calculated between the target phase and the input phase. (Block 910) For each data stream, the phase difference is mapped to a fixed phase range. (Block 912) The phase differences are weighted and combined to yield a combined phase difference. (Block 914) Based on the combined phase difference, an integer phase adjustment signal and a fractional phase adjustment signal are calculated. (Block 916) The phase offset between the data streams is corrected based on the integer phase adjustment signal and the fractional phase adjustment signal. (Block 920) The aligned data streams can then be combined. (Block 922)

The zero phase start calculation disclosed herein enables the phase offset between signals from read heads in an array reader to be cancelled so that the multiple streams can be combined based on the preamble signal-to-noise ratio estimation, improving zero phase start quality. The zero phase start calculation handles multiple orthogonal preambles, reducing adjacent track interference in the zero phase start calculation.

It should be noted that the various blocks shown in the drawings and discussed herein may be implemented in integrated circuits along with other functionality. Such integrated circuits may include all of the functions of a given block, system or circuit, or a subset of the block, system or circuit. Further, elements of the blocks, systems or circuits may be implemented across multiple integrated circuits. Such integrated circuits may be any type of integrated circuit known in the art including, but are not limited to, a monolithic integrated circuit, a flip chip integrated circuit, a multichip module integrated circuit, and/or a mixed signal integrated circuit. It should also be noted that various functions of the blocks, systems or circuits discussed herein may be implemented in either software or firmware. In some such cases, the entire system, block or circuit may be implemented using its software or firmware equivalent. In other cases, the one part of a given system, block or circuit may be implemented in software or firmware, while other parts are implemented in hardware.

In conclusion, the present invention provides novel zero phase start calculation in an array reader magnetic recording system. While detailed descriptions of one or more embodiments of the invention have been given above, various alternatives, modifications, and equivalents will be apparent to those skilled in the art without varying from the spirit of the invention. Therefore, the above description should not be taken as limiting the scope of the invention, which is defined by the appended claims.

What is claimed is:

1. An apparatus comprising:
   an array reader comprising a plurality of read heads operable to read a preamble pattern from a magnetic storage medium;
   a plurality of analog to digital converters operable to sample an output of each of the read heads to generate a plurality of digital data streams for the preamble pattern; and
   a zero phase start calculation circuit operable to calculate a phase offset between the digital data streams and to generate an integer phase adjustment signal and a fractional phase adjustment signal.

2. The apparatus of claim 1, wherein different preamble patterns are recorded on alternating tracks of the magnetic storage medium.

3. The apparatus of claim 2, wherein the different preamble patterns comprise sinusoidal patterns with different periods.

4. The apparatus of claim 2, wherein a first of the different preamble patterns comprises a repeating 1100 pattern, and wherein a second of the different preamble patterns comprises a repeating 111000 pattern.

5. The apparatus of claim 1, wherein the zero phase start calculation circuit is operable to calculate a phase difference between a target sampling phase and an input sampling phase for each of the plurality of digital data streams.

6. The apparatus of claim 5, wherein the zero phase start calculation circuit comprises a combination circuit operable to combine the phase difference for each of the plurality of digital data streams.

7. The apparatus of claim 6, wherein the combination circuit is operable to calculate the weighting factors based at least in part on an estimate of a signal-to-noise ratio for the preamble pattern.

8. The apparatus of claim 6, wherein the combination circuit is operable to calculate the weighting factors based at least in part on an accumulator window length in the zero phase start calculation circuit.

9. The apparatus of claim 5, further comprising a loop pulse estimation circuit operable to calculate a loop pulse estimation sin term and a loop pulse estimation cos term.

10. The apparatus of claim 9, wherein the zero phase start circuit is operable to calculate the target sampling phase based on the loop pulse estimation sin term and a loop pulse estimation cos term.

11. The apparatus of claim 10, wherein the zero phase start circuit is operable to calculate the target sampling phase in a CORDIC circuit.

12. The apparatus of claim 5, further comprising at least one calculation circuit operable to calculate an input sample sin term and an input sample cos term for the plurality of digital data streams.

13. The apparatus of claim 12, wherein the zero phase start circuit is operable to calculate the input sampling phase based on the input sample sin term and the input sample cos term.

14. The apparatus of claim 5, further comprising a mapping circuit operable to shift the phase difference to within a range of $[0, 2\pi)$.

15. The apparatus of claim 5, further comprising an adder circuit operable to add a fixed phase shift to the target sampling phase.

16. The apparatus of claim 5, further comprising a subtraction circuit operable to subtract a fixed phase shift from the fractional phase adjustment signal.

17. A method for correcting a phase difference between a plurality of digital data streams, comprising:
   calculating a target phase for each of the plurality of digital data streams containing a preamble pattern based on at least one loop pulse estimation;
   calculating an input phase for each of the plurality of digital data streams;
   calculating a phase difference between each target phase and input phase;
   weighting and combining the phase differences;
   calculating an integer phase adjustment signal and a fractional phase adjustment signal based on the weighted and combined phase differences;
   adjusting a phase of at least one of the plurality of digital data streams based on the integer phase adjustment signal and a fractional phase adjustment signal; and
   combining the plurality of digital data streams.

18. The method of claim 17, wherein the weighting of the phase differences is based at least in part on a window length used in calculating the target phase and at least in part on an estimate of a signal-to-noise ratio for the preamble pattern.

19. The method of claim 17, further comprising reading the plurality of digital data streams from a track on a magnetic storage medium with an array reader, wherein orthogonal preamble patterns are stored on alternating tracks on the magnetic storage medium.

20. A storage device, comprising:
- a magnetic storage medium operable to store data in data tracks, wherein orthogonal preamble patterns are stored on alternating ones of the data tracks;
- a head assembly disposed in relation to the storage medium and comprising an array reader with a plurality of read heads to read and write the data on the storage medium;
- a zero phase start calculation circuit operable to calculate an integer phase offset signal and a fractional phase offset signal for signals from the plurality of read heads based on a preamble pattern in a target one of the data tracks;
- a phase correction circuit operable to correct a phase offset between the signals from the plurality of read heads based on the integer phase offset signal and a fractional phase offset signal; and
- a combining circuit operable to combine the signals from the plurality of read heads.

* * * * *